United States Patent
Beerse et al.

(10) Patent No.: US 9,043,471 B2
(45) Date of Patent: *May 26, 2015

(54) PREDICTIVE SCALING FOR CLUSTERS

(71) Applicant: International Business Machines Corporation, Armonk, NY (US)

(72) Inventors: Chelsea C. Beerse, Fairport, NY (US); Christopher M. Bosko, Durham, NC (US); Brian D. Osenbach, Cary, NC (US); Jeffrey B. Sloyer, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 127 days.

This patent is subject to a terminal disclaimer.

(21) Appl. No.: 13/775,957

(22) Filed: Feb. 25, 2013

(65) Prior Publication Data

US 2014/0189126 A1 Jul. 3, 2014

Related U.S. Application Data

(63) Continuation of application No. 13/732,545, filed on Jan. 2, 2013.

(51) Int. Cl.
*G06F 15/173* (2006.01)
*H04L 12/911* (2013.01)
*G06Q 10/10* (2012.01)
*G06Q 50/00* (2012.01)

(52) U.S. Cl.
CPC ............. *H04L 47/70* (2013.01); *G06Q 10/109* (2013.01); *G06Q 50/01* (2013.01)

(58) Field of Classification Search
USPC .......................................... 709/223, 226, 200
See application file for complete search history.

(56) References Cited

U.S. PATENT DOCUMENTS

| 2010/0015926 | A1* | 1/2010 | Luff ........................... 455/67.13 |
| 2012/0144038 | A1 | 6/2012 | Hildebrand |
| 2014/0149590 | A1* | 5/2014 | Mallipeddi et al. ........... 709/226 |

OTHER PUBLICATIONS

"Auto Scaling," Amazon Web Services, copyright 2012, 3 pages. Retrieved Nov. 26, 2012 from http://aws.amazon.com/autoscaling/.
"Xeround Announces Industry-First Auto-Scaling Cloud Database," Xeround the Cloud Database, Apr. 12, 2011, 3 pages. Retrieved Nov. 26, 2012 from http://xeround.com/2011/04/xeround-announces-industry-first-auto-scaling-cloud-database/.
"Tier 3's Predictive Autoscaler Enhances Cloud Performance and Advanced IT Operations Automation," Tier 3, copyright 2011, 2 pages. Retrieved Nov. 26, 2012 from http://cloud.tier3.com/acton/attachment/1427/f-002a/0/-/-/-/-/file.pdf.
Beerse et al., "Predictive Scaling for Clusters", U.S. Appl. No. 13/732,545, filed Jan. 2, 2013, 40 pages.

(Continued)

*Primary Examiner* — El Hadji Sall
(74) *Attorney, Agent, or Firm* — Yee & Associates, P.C.; Parashos T. Kalaitzis

(57) ABSTRACT

A method for managing resources of clusters is disclosed. A computer retrieves data about an event and other data about past events. The computer selects a set of past events that are similar to the event, based on the data about the event and the other data about the past events. The computer then analyzes the data about the event and the other data about the past events associated with the set of past events to identify a portion of the resources of one or more of the clusters required for use by the event.

6 Claims, 7 Drawing Sheets

(56) References Cited

OTHER PUBLICATIONS

Office Action, dated Sep. 24, 2014, regarding U.S. Appl. No. 13/732,545, 16 pages.

Notice of allowance, dated Jan. 5, 2015 regarding U.S. Appl. No. 13/732,545, 9 pages.

* cited by examiner

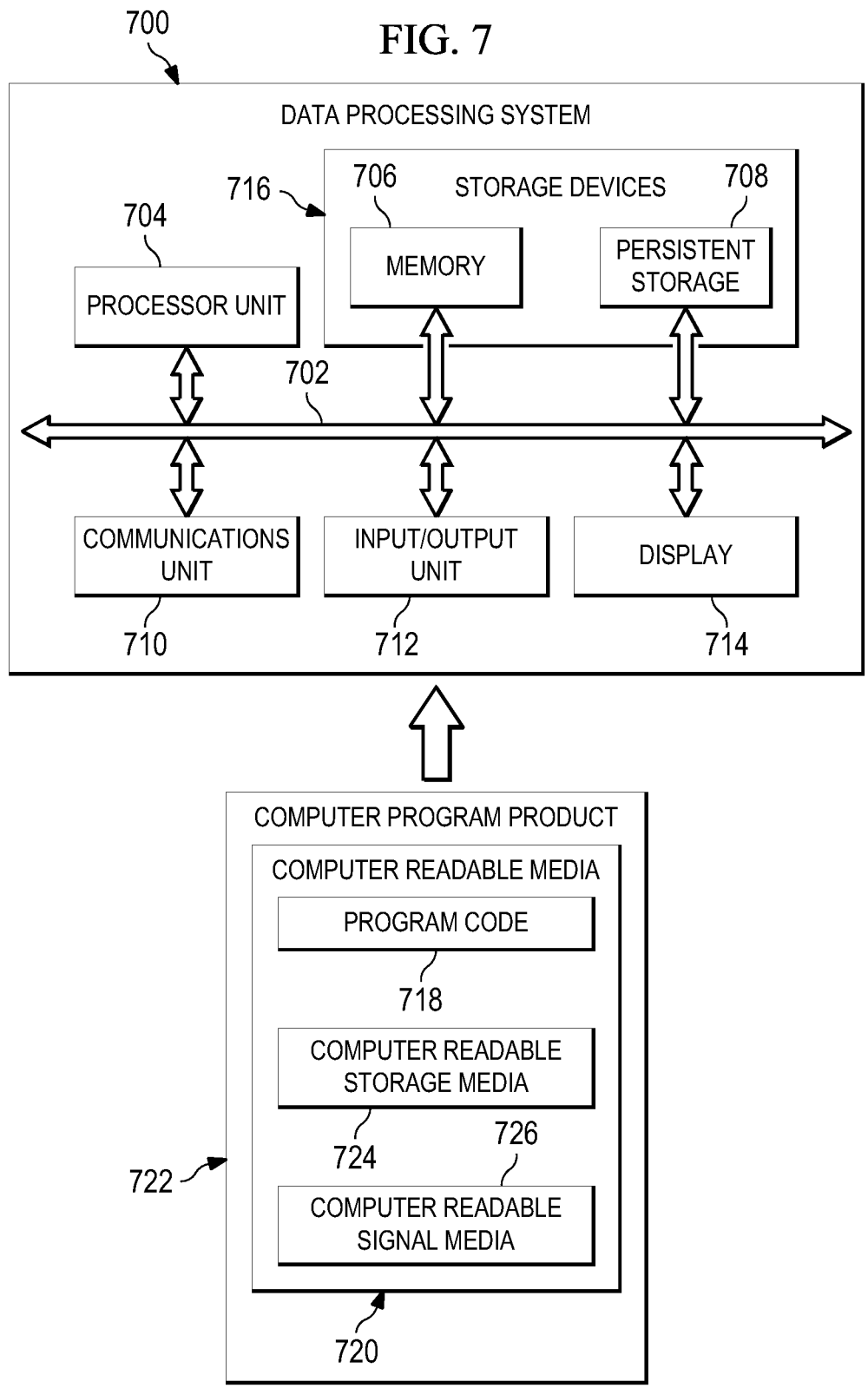

PREDICTIVE SCALING FOR CLUSTERS

This application is a continuation of and claims the benefit of priority to U.S. patent application Ser. No. 13/732,545, filed on Jan. 2, 2013, entitled "Predictive Scaling for Clusters". The contents of which are hereby incorporated by reference

BACKGROUND OF THE INVENTION

1. Field of the Invention

The disclosure relates generally to using data processing systems for cluster resource management and, in particular, to managing allocations of resources of clusters for events. Still more particularly, the present disclosure relates to using social data associated with events to improve the allocations of resources of clusters for events.

2. Description of the Related Art

As today's business needs are becoming more reliant on computer based hardware and software solutions, the need for having fast, reliable, and low cost solutions is more prevalent. Companies may use a portion of resources of clusters of computers to host their solutions. Using clusters to host solutions allows the companies to handle increased global traffic while also providing failover to prevent loss of service. Scheduled events may increase user demand for these hosted solutions.

One way to manage availability of resources of clusters while also keeping costs down is to scale a number of nodes in a cluster based on user demand. Current clustering products allow system administrators to define conditions that trigger either an increase or decrease in the number of nodes in a cluster. These conditions for changing the number of nodes in a cluster may be based on a time of day, week, month, or other schedule. However, allocating resources based on a schedule is at best an educated guess based on past performance, not current conditions. There is no guarantee that what has happened in the past will stay true for future events. This method also cannot take into account special events that may skew demand for resources or cause unexpected spikes or drops in demand.

Conditions for triggering a change in the number of nodes in a cluster may also be based on a current utilization of cluster resources. However, conditional changes based on machine resource use are reactive and thus may result in unsatisfying solution performance. For example, for solutions that can trigger quick increases in user participation, such as at the start of a meeting. In this example, there may not be enough time to reactively increase the number of nodes in a cluster, and thus the users may see response degradation.

Social networks have significantly enhanced information sharing over the Internet. Social networking sites, such as Facebook® and Twitter provide collaboration tools which allow users to interact with each other by exchanging messages with other computer users. Typical collaboration tools include tools for chatting, texting, instant messaging, multimedia messaging, emailing, conferencing, tweeting, and commenting.

Through the use of social networks users sometimes express interest and non-interest in events. The expression of interest may be for a particular event, for events of a particular type, and for topics associated with an event. For example, the expression of interest may be formed as a like or dislike. Using natural language processing, computational linguistics, and text analytics a computer system can mine source material of social networks to derive expressions of interest about events. Currently however, there is no system or process available for using expressions of interests in events in social networks to predicatively scale resources of clusters for use by solutions association with the events.

Therefore, it would be advantageous to have a method, data processing system, and computer program product that takes into account at least some of the issues discussed above, as well as possibly other issues.

SUMMARY

In one illustrative embodiment a method for managing resources of clusters is disclosed. A data processing system retrieves data about an event and other data about past events. The data processing system selects a set of past events that are similar to the event, based on the data about the event and the other data about the past events. The data processing system then analyzes the data about the event and the other data about the past events associated with the set of past events to identify a portion of the resources of one or more of the clusters required for use by the event.

BRIEF DESCRIPTION OF THE DRAWINGS

FIG. 7 is an illustration of a data processing system in accordance with an illustrative embodiment.

DETAILED DESCRIPTION OF THE PREFERRED EMBODIMENT

Figure 1:
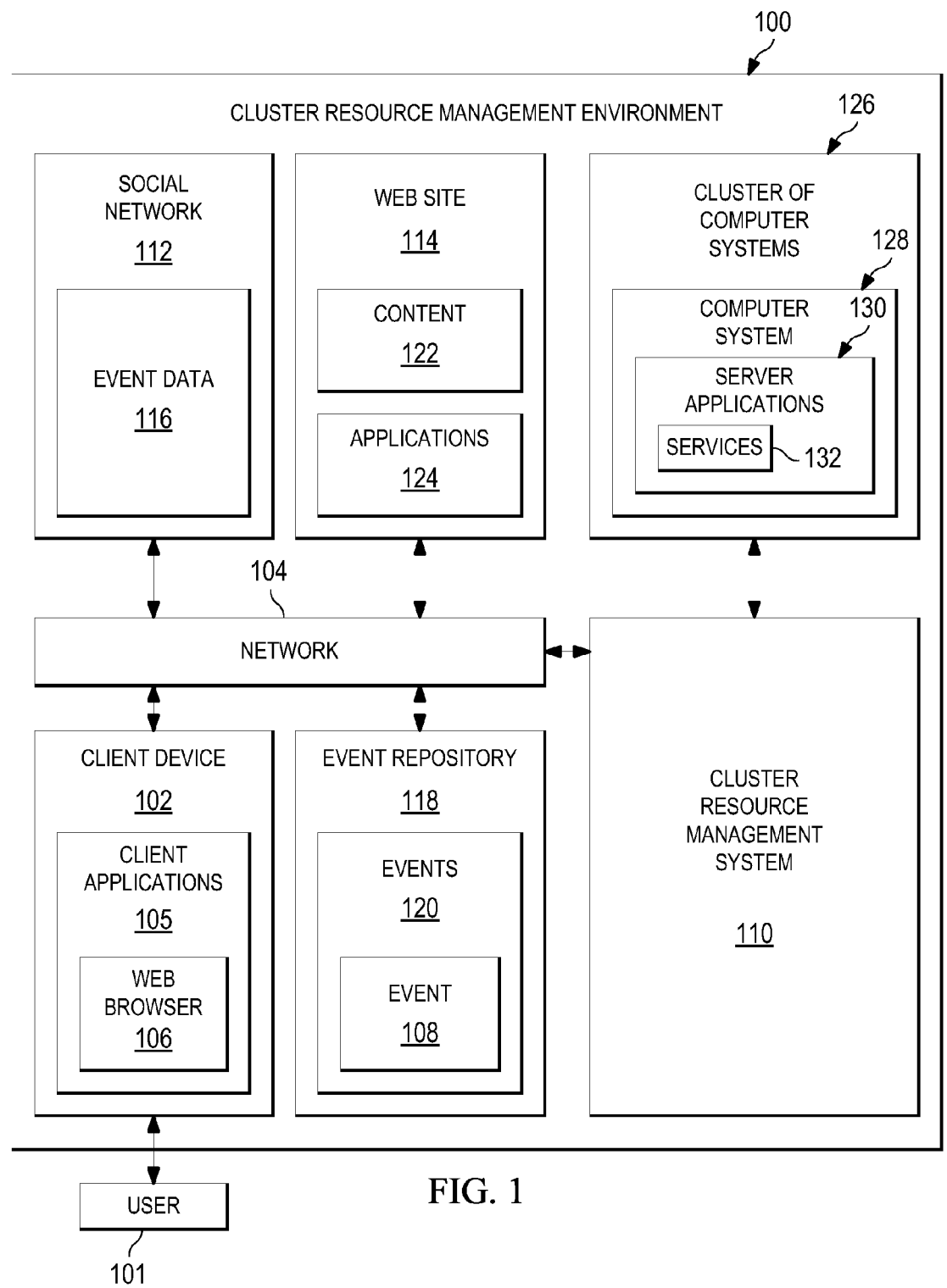
FIG. 1 is a block diagram of a cluster resource management environment for managing resources of clusters in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments recognize and take into account that existing web based applications are available for use by users of web sites. Web based applications typically run on a web server. These web based applications communicate with web browsers by generating web pages and sending the web pages to a web browser. The generated web pages are typically displayed on a display screen by a web browser running on a computing device. For example, a web based application for a shopping web site may generate web pages for a sale. In this example, customers may make selections for purchasing items made available to them during the sale. As another example, a collaboration web site may provide content and applications for exchanging information with attendees of a meeting. In this example, attendees of the meeting may use the applications to browse the content and to provide opinions about the content.

As used herein, the term "computing device" means a hardware device with a processor unit and a capability to display information on a display device and may also include the capability to emit audio on a speaker. For example, the computing device may be a computer, a television with a processor unit, a smart phone, and any other suitable device.

The illustrative embodiments also recognize and take into account that existing web based applications are available for users of social networking web sites to share expressions of interest and non-interest in events. As used herein, an expression of interest in an event may include a like or a dislike, such as an indication that a user would like to attend the event. The expression of interest may also be based on a scale, such as percentage between 0 and 100. For example, a user may identify a percent likelihood that they will attend an event. In this example 100% likelihood indicates the user will very likely attend, 50% indicates there is a 50% chance the user will attend, and 0% indicates that the user, in all likelihood, will not attend.

The illustrative embodiments further recognize and take into account that existing sentiment analytics tools for performing natural language processing, computational linguistics, and text analytics are available to identify and extract subjective information in source materials. These sentiment analytics tools may be used to identify user sentiment about aspects of entities associated with events from information entered by users into social networks and collaboration tools.

The illustrative embodiments still further recognize, through the use of collaboration tools users sometimes express sentiments about features and aspects of entities that may be associated with events. As used herein, an entity is something that exists by itself, although it need not be of material existence. An entity is defined as a particular and discrete unit. For example, an entity may be a person, an organization, a thing, an abstract idea, a problem, a solution, and a particular type of activity. The entities discussed may be particularly named events, persons, places, or things and sometimes may include unnamed entities. An aspect of an entity is an appearance of the entity to the eye or mind. Some aspects of entities include physical appearances such as those based on sight, touch, smell, and other senses. Other aspects of entities include descriptions of metaphysical concepts, such as an aspect of a particular philosophy. More particularly, entities may have aspects that contrast one entity from other entities.

Thus, the different illustrative embodiments provide a method, apparatus, and computer program product to manage resources of clusters. For example, the different illustrative embodiments may use a process for managing allocations of resources of a plurality of clusters of computer systems. For example, a cluster resource management system may retrieve data about an event and other data about past events. The cluster resource management system may select a set of past events that are similar to the event, based on the data about the event and the other data about the past events. The cluster resource management system next analyzes the data about the event and the other data about the past events associated with the set of past events to identify a portion of the resources of one or more of the clusters required for use by the event. Responsive to identifying the portion of the resources of the one or more of the clusters required for use by the event, the cluster resource management system then allocates the portion of the resources of the one or more of the clusters required for use by the event.

With reference now to the figures and, in particular, with reference to FIG. 1, a block diagram of a cluster resource management environment for managing resources of clusters is depicted in accordance with an illustrative embodiment. In this illustrative example, cluster resource management environment 100 is depicted in block diagram form.

In these illustrative examples, users, such as user 101, may use client applications 105 running on computing devices such as client device 102 within cluster resource management environment 100. Client applications 105 running on client device 102 may take various forms. For example, client applications 105 may include at least one of web browser 106, a cluster resource management application, a database application, a smart-phone application, and other suitable types of applications for cluster resource management environment 100. In these illustrative examples, web browser 106 may display information on a display screen of client device 102 and may also present information to user 101 by using a speaker to emit audio.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and ten of item C; four of item B and seven of item C; and other suitable combinations.

As depicted, client device 102 communicates with cluster resource management system 110 over network 104. In these illustrative examples, user 101 may send event 108 to cluster resource management system 110 for processing. In these illustrative examples, event 108 at least includes a start time and duration of the event, and an event type specifying a purpose of the event. For example, event 108 may be a sale, a meeting, an election, a holiday, a group activity, and any other type of occasion for which cluster resource management is useful. Event 108 may also comprise an indication for repeating. For example, event 108 may repeat based on a set of particular dates and on a cycle, such as daily, weekly, monthly, quarterly, annually, and any other suitable schedule for events.

As also depicted, cluster resource management system 110 and client device 102 may communicate with social network 112 and web site 114 over network 104. In these illustrative examples, social network 112 may be a web based application having event data 116 entered by users, such as user 101. As depicted, event data 116 may comprise expression of interest about event 108. For example, one or more members of social network 112 may have previously entered event data 116 comprising an expression of interest about event 108, such as an expression of interest about an aspect of an entity associated with event 108. Event data 116 may also comprise expression of interest about other past and current events similar to event 108. Social network 112 may provide services to search for, browse, enter, and modify event data 116.

In these illustrative examples, event repository 118 may be used in cluster resource management environment 100 to store events. Events 120 in event repository 118 may include past, current, and future events. For example, user 101 may use web browser 106 to enter event 108 into events 120. As another example, cluster resource management system 110 may determine event 108 from event data 116 in social network 112. As still another example, event repository 118 may receive event 108 from an application in web site 114.

In these illustrative examples, web site 114 comprises content 122 and applications 124 for event 108. Content 122 may comprise web pages, audio, video, pictures, documents, and any other type of content that may be provided to client applications 105 during event 108. Applications 124 of web site 114 run on a computer system such as a node of a cluster. Applications 124 may host sessions of client applications 105 for delivering content 122. Applications 124 may also generate content 122. For example, subsequent to generation of a session for user 101 for browsing web site 114 during event 108, instances of applications 124 may generate content 122 for the session and send content 122 to web browser 106 for display on client device 102. As used herein, a node of a cluster is a computer system, such as computer system 128 in cluster of computer systems 126. Each node or computer system in cluster of computer systems 126 may host one or more sessions with one or more users for web site 114 during events, such as event 108.

In these illustrative examples, computer system 128 within cluster of computer systems 126 is a group of one or more computers. Also, as used herein, "group of" when used with reference to items means one or more items. For example, group of computer systems is one or more computer systems. When computer system 128 is more than one computer, the computer system may take the form of a computer cluster, cluster of computer systems 126, or other configurations of computer systems configured to run server applications 130.

Cluster resource management system 110 uses sever applications 130 located on computer system 128 in cluster of computer systems 126. A computer system is one or more computers in these illustrative examples. Server applications 130 may be any applications configured to process communications to provide services 132. Server applications 130 may be, for example, at least one of a database server, a file transfer protocol (FTP) server, a web server, a mail server, and/or other suitable types of applications. Services 132 may include, for example, at least one of retrieving a file, retrieving a webpage, retrieving information, writing information, downloading a program, and/or other suitable types of access.

Cluster resource management system 110 may be implemented using hardware, software, or a combination of the two. In these illustrative examples, cluster resource management system 110 is configured to manage sentiment analysis using cluster of computer systems 126. In these illustrative examples, cluster resource management system 110 is configured to use services 132 of server applications 130. For example, cluster resource management system 110 may use a service in services 132 to perform analysis on event data 116 for each event in events 120. As another example, cluster resource management system 110 may use another service in services 132 to generate and publish commands to allocate resources in cluster of computer systems 126 for content 122 and applications 124 for event 108. In these illustrative examples, cluster resource management system 110 may be implemented as a server, such as a web server, that is used by users for managing resources of clusters.

As depicted, cluster resource management system 110 may retrieve event data 116. In these illustrative examples, cluster resource management system 110 may select a set of past events from events 120 that are similar to event 108. Cluster resource management system 110 may also analyze information about event 108 in event data 116 and other information about the set of past events in event data 116 to identify a portion of resources of one or more clusters required for use by event 108.

The illustration of cluster resource management environment 100 in FIG. 1 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional social networks, in addition to social network 112, may be present within cluster resource management environment 100. Also, although cluster resource management system 110 is shown as a block separate from cluster of computer systems 126, cluster resource management system 110 may be implemented in computer system 128. In other examples, cluster resource management system 110 may be implemented in one or more computer systems in cluster of computer systems 126.

Further, although social network 112, web site 114, and cluster resource management system 110 are shown in the block for cluster resource management environment 100 they may be remote from each other, such as by being in different locations. For example, social network 112 may be located in a first physical location and web site 114 may be located in a second physical location different from the first physical location.

Figure 2:
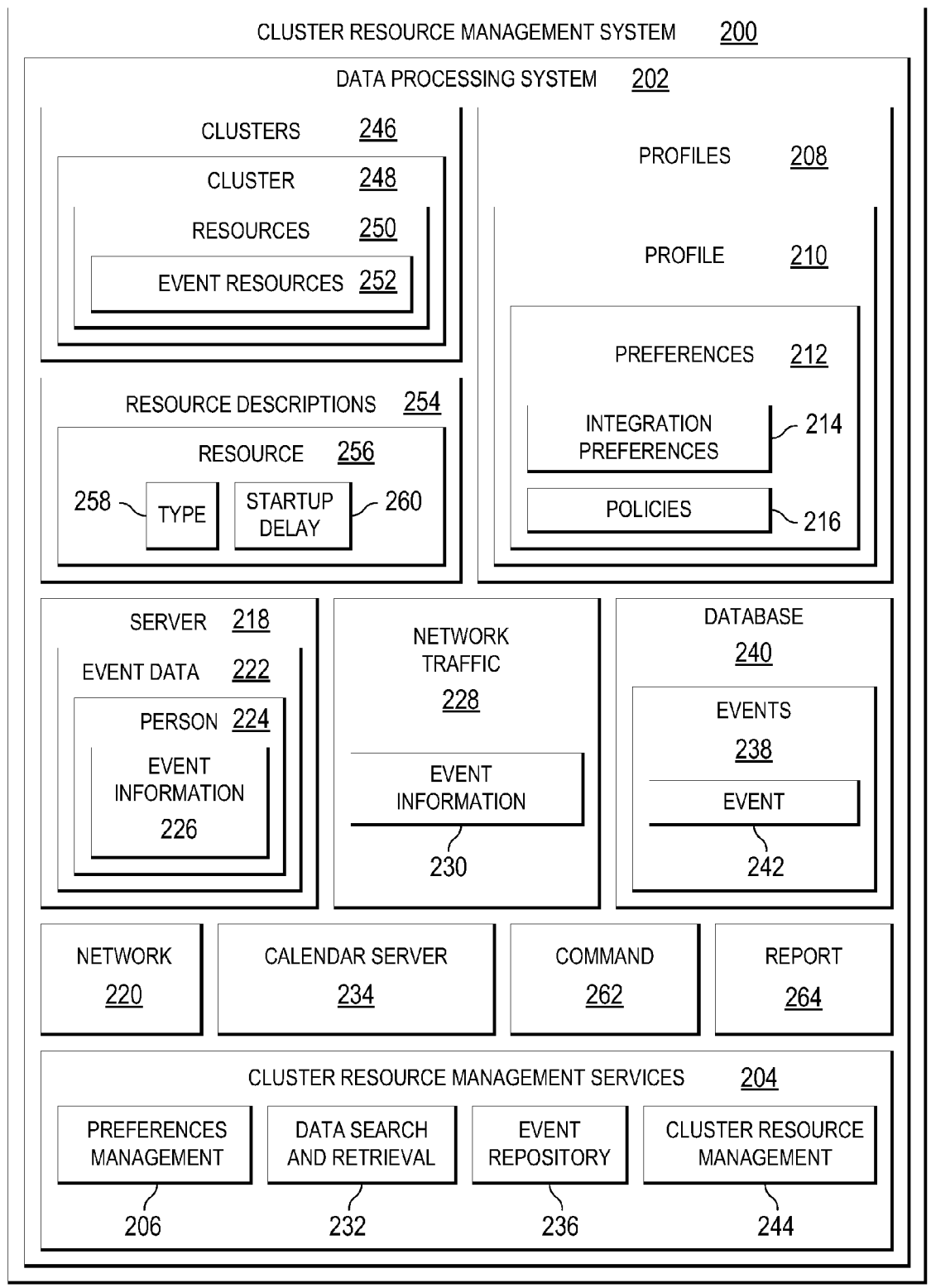
FIG. 2 is a block diagram of components involved in managing resources of clusters in a data processing system in a cluster resource management system in accordance with an illustrative embodiment.

Turning next to FIG. 2, a block diagram of components involved in managing resources of clusters in a data processing system in a cluster resource management system is depicted in accordance with an illustrative embodiment. Cluster resource management system 200 is an example of one implementation of cluster resource management system 110 in cluster resource management environment 100 in FIG. 1.

In this illustrative example, data processing system 202 is present in cluster resource management system 200. Data processing system 202 may be any combination of hardware components implementing cluster resource management system 200. Data processing system 202 comprises cluster resource management services 204. In these illustrative examples, cluster resource management services 204 comprise a number of services that manage resources of clusters. Preferences management 206 is a service included in cluster resource management services 204 that manages profiles of users of cluster resource management system 200.

As depicted, profiles 208 include one or more profiles in cluster resource management system 200 of users of cluster resource management system 200. In these illustrative examples, profile 210 is profile of a user located in profiles 208. Each profile in profiles 208 is an account or other record of information for users of cluster resource management system 200. In these illustrated examples, profiles, such as profile 210, include preferences 212 of users of cluster resource management system 200. Preferences 212 of users may be selected by a user, an administrator, and by a rule using default preferences. Preferences 212 include integration preferences 214 for using social networks, for using event repositories, and for hosting content and applications of web sites. Preferences 212 also include polices 216 for identifying portions of clusters required for use by events. In these illustrative examples, policies 216 include rules for using updates to data about current events, older data about the current events, and data about past events to calculate the portions of resources of clusters required for use by events. For example, policies 216 may comprise a rule emphasizing use of one of data about current events and data about past events. In this example, the rule may set a threshold for an age of data about past events, such as filtering out data that is an hour old, a day old, a week old, and a year old, and other suitable time frames. In these illustrative examples, the shorter time frames for filtering out data are preferably used and provided for because using current data is more indicative of current trends of members of social networks. Further in this example, the rule may provide for a multiplier to use to as emphasis and/or de-emphasis for data about current events over older data about past events. In these illustrative examples, the multiplier selected by a user may be any real number from negative infinity to positive infinity.

In these illustrative examples, integration preferences 214 in profile 210 include an identification of one or more servers, such as server 218. Integration preferences 214 may also include an identification of information for communicating with server 218. For example, the information for communicating with server 218 may, include identification of networking protocols used by server 218 over a network, such as network 220, identification of networking addresses of server 218 in network 220, identification of user names and passwords for gaining access to event data 222 in server 218, and any other suitable information for communicating with server 218 in cluster resource management system 200.

In these illustrative examples, server 218 may host one or more web sites, such as social network 112 and web site 114 in FIG. 1. As depicted, server 218 may include event data 222, such as event information 226 from person 224. In these illustrative examples, event information 226 may be used to identify interest in an event of persons who may attend an event, such as person 224. Event data 222 is an example of event data 116 in FIG. 1. As depicted, network traffic 228 may include data sent between users of collaboration tools over network 220. In these illustrative examples, network traffic 228 may be monitored by a data processing system, such as data processing system 202. In these illustrative examples, event information 230 is an example of event data 116 in FIG. 1. In these illustrative examples, event information 226 and event information 230 may comprise one or more sentiments about an event. For example, the sentiments in event information 226 and event information 230 may comprise expressions of positive, negative, and neutral interest about aspects of entities associated with the event.

Data search and retrieval 232 is a service included in cluster resource management services 204 that uses integration preferences 214 to search for and retrieve event information, such as event information 226 in server 218 and event information 230 in network traffic 228. Data search and retrieval 232 may also use integration preferences 214 to retrieve calendar entries associated with events from calendar server 234. For example, each of the calendar entries may comprise an indication that a particular user intends to attend the event. In these illustrative examples, calendar server 234 may be an example of social network 112 in FIG. 1, an enterprise calendar server, and any other suitable source for calendaring information in cluster resource management system 200.

Event repository 236 is a service included in cluster resource management services 204 for managing storage of data about events 238 in database 240. Event repository 236 is an example of event repository 118 in FIG. 1. As depicted, events 238 include one or more events such as event 242. In these illustrative examples, events 238 is an example of events 120 in FIG. 1 and event 242 is an example of event 108 in FIG. 1.

Cluster resource management 244 is a service included in cluster resource management services 204 for managing resources of clusters 246, such as resources 250 of cluster 248. In these illustrative examples, cluster resource management 244 may select a set of past events from events 238 that are similar to event 242. Cluster resource management 244 may also analyze information about event 242 and other information about the set of past events to identify event resources of one or more clusters required for use by event 242. For example, event resources 252 may comprise one or more resources determined by cluster resource management 244 as needed for event 242 based on policies 216. Subsequent to identifying event resources 252, cluster resource management 244 may then allocate event resources 252 for use by event 242.

As depicted, resource descriptions 254 comprise a description of one or more types of resources of clusters 246. Resource 256 in resource descriptions 254 is an example of a particular type of resource 256 in clusters 246. For example, description of resource 256 includes type 258 of resource 256 and startup delay 260 of resource 256. In this example, type 258 of resource may be a node in a cluster for hosting content and applications of a web site for events, such as event 242. Further in this example, startup delay 260 may be an amount of time required to power up resources of type 258.

In these illustrative examples, in a process for starting up resources for use by event 242, cluster resource management 244 may retrieve startup delay 260 for each resource in event resources 252. Cluster resource management 244 may next calculate a time when each of the resources in event resources 252 needs to be powered up based on startup delay 260 of each respective resource in event resources 252. Cluster resource management 244 may then generate and send commands, such as command 262, to clusters 246 for powering up each of the resources in event resources 252 at the time for which each resource needs to power up for use by event 242.

The illustration of cluster resource management environment 200 in FIG. 2 is not meant to imply physical or architectural limitations to the manner in which different illustrative embodiments may be implemented. Other components in addition to and/or in place of the ones illustrated may be used. Some components may be unnecessary. Also, the blocks are presented to illustrate some functional components. One or more of these blocks may be combined and/or divided into different blocks when implemented in an illustrative embodiment.

For example, in some illustrative examples, additional services, in addition to the services shown cluster resource management services 204, may be present within cluster resource management system 200. For example, a service in services 132 in FIG. 1 to authorize computing devices such as client device 102 in FIG. 1 may be included in cluster resource management system 200. In this example, the authorization of client device 102 may be required by a policy in policies 216 before client device 102 is allowed access to events 238.

As another example, a service in cluster resource management services 204 in FIG. 2 to generate report 264 showing electrical power savings and/or cost savings may be included in cluster resource management system 200. In this example, the service to generate report 264 may execute on an intermittent basis or based on a receipt of a request to generate report 264. Further in this example, report 264 may include a savings calculated based on a difference between resource use of clusters during similar prior events that were not performed using cluster resource management system 200 and resource use of clusters for a current event that was performed using cluster resource management system 200.

Figure 3:
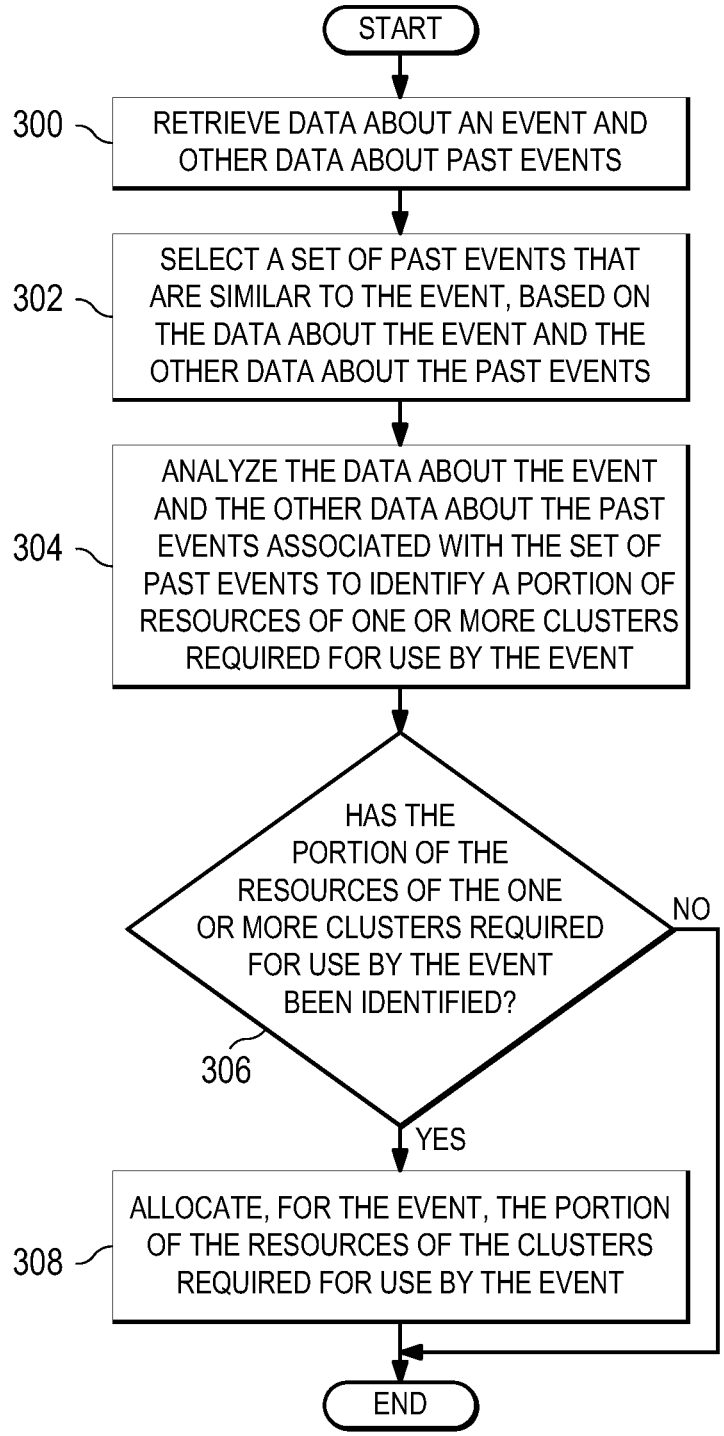
FIG. 3 is a flow chart of a process for managing allocations of resources of clusters in accordance with an illustrative embodiment.

Turning now to FIG. 3, an illustrative example of a flowchart of a process for managing allocations of resources of clusters is depicted in accordance with an illustrative embodiment. The steps in FIG. 3 may be implemented by cluster resource management system 200 in FIG. 2. In particular, the steps in the process may be implemented in software, hardware, or a combination of the two in cluster resource management services 204 in data processing system 202 in FIG. 2.

The process begins by retrieving data about an event and other data about past events (step 300). In this illustrated process, the data about an event and other data about past events are examples of event data 222 in FIG. 2 and the event is an example of event 242 in FIG. 2. The process next selects a set of past events that are similar to the event, based on the data about the event and the other data about the past events (step 302).

The process then analyzes the data about the event and the other data about the past events associated with the set of past events to identify a portion of resources of one or more clusters required for use by the event (step 304). Responsive to identifying the portion of the resources of the one or more clusters required for use by the event (step 306), the process allocates, for the event, the portion of the resources of the clusters required for use by the event (step 308) with the process terminating thereafter.

Figure 4:
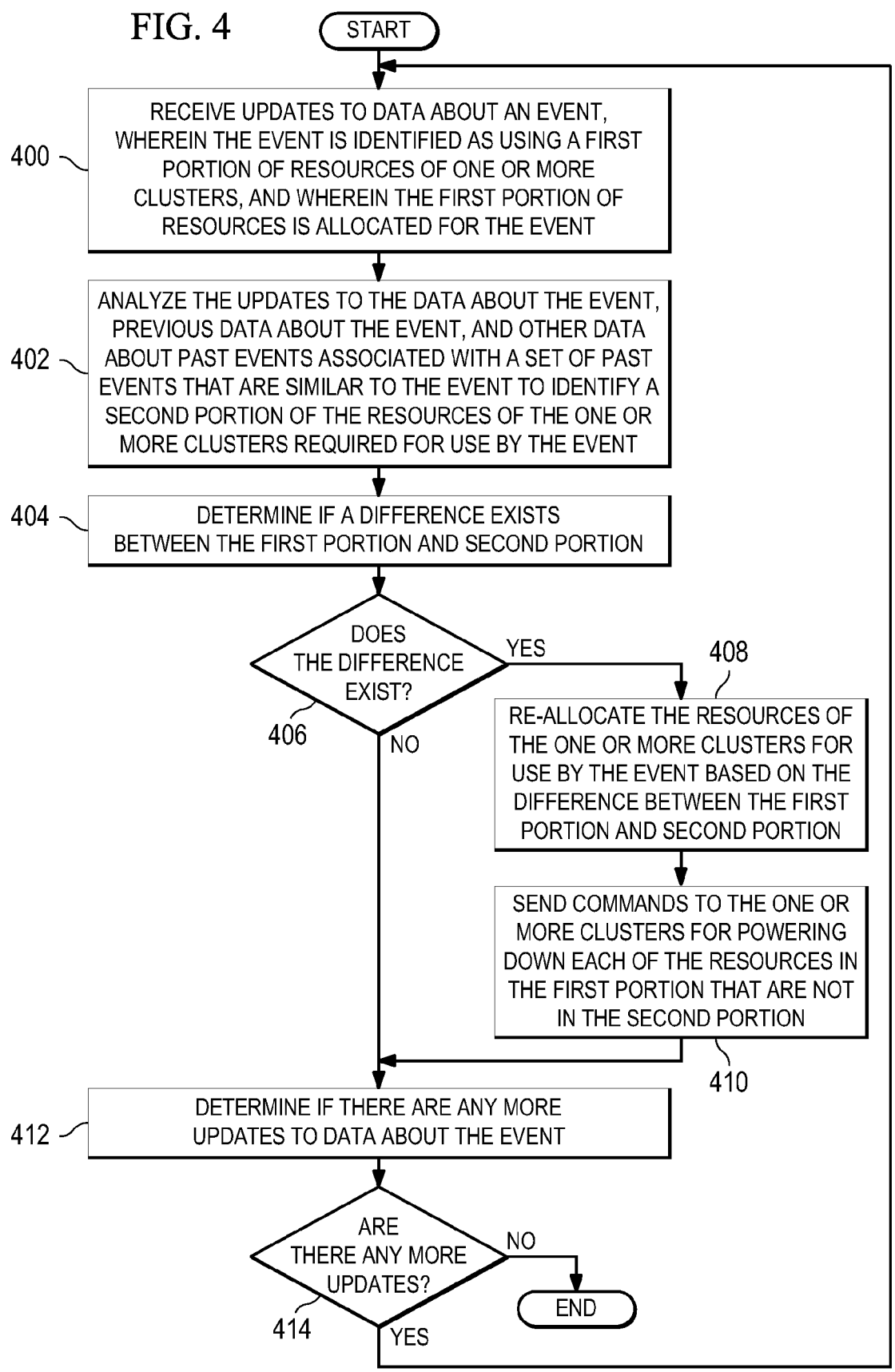
FIG. 4 is a flow chart of a process for managing re-allocations of resources of clusters in accordance with an illustrative embodiment.

Turning next to FIG. 4, an illustrative example of a flowchart of a process for managing re-allocations of resources of clusters is depicted in accordance with an illustrative embodiment. The steps in FIG. 4 may be implemented by cluster resource management system 200 in FIG. 2. In particular, the steps in the process may be implemented in software, hardware, or a combination of the two in cluster resource management services 204 in data processing system 202 in FIG. 2.

The process begins by retrieving updates to data about an event, wherein the event is identified as using a first portion of resources of one or more clusters, and wherein the first potion of resources is allocated for the event (step 400). In this illustrated process, the updates to data about an event and other data about past events are examples of event data 222 in FIG. 2, the event is an example of event 242 in FIG. 2, and the first portion of resources of one or more clusters is an example of event resources 252 in FIG. 2.

The process next analyzes the updates to the data about the event, previous data about the event, and other data about past events associated with a set of past events that are similar to the event to identify a second portion of the resources of the one or more clusters required for use by the event (step 402). The process then determines if a difference exists between the first portion and second portion (step 404).

Responsive to a determination that the difference exists in (step 406), the process continues by re-allocating the resources of the one or more clusters for use by the event based on the difference between the first portion and second portion (step 408) and then sending commands to the one or more clusters for powering down each of the resources in the first portion that are not in the second portion (step 410).

The process then determines if there are any more updates to data about the event (step 412). As depicted in step 414, responsive to the process identifying that there are more updates, the process goes back to step 400, otherwise if there are no more updates, the process terminates.

Figure 5:
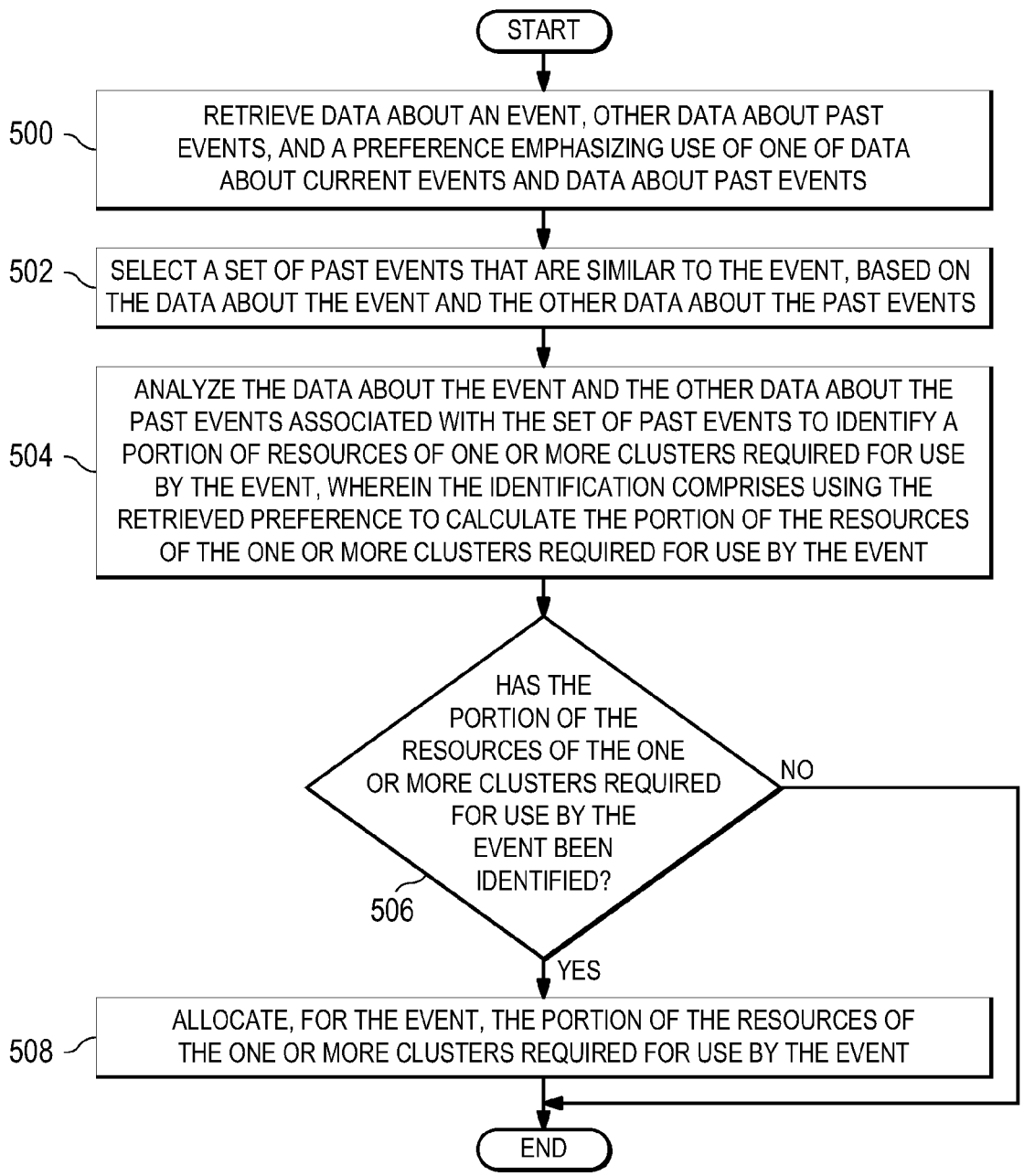
FIG. 5 is a flow chart of a process for managing allocations of resources of clusters using preferences in accordance with an illustrative embodiment.

Turning next to FIG. 5, an illustrative example of a flowchart of a process for managing allocations of resources of clusters using preferences is depicted in accordance with an illustrative embodiment. The steps in FIG. 5 may be implemented by cluster resource management system 200 in FIG. 2. In particular, the steps in the process may be implemented in software, hardware, or a combination of the two in cluster resource management services 204 in data processing system 202 in FIG. 2.

The process begins by retrieving data about an event, other data about past events, and a preference emphasizing use of one of data about current events and data about past events (step 500). In this illustrated process, the data about an event and other data about past events are examples of event data 222 in FIG. 2, the event is an example of event 242 in FIG. 2, the preference is an example of a preference in policies 216 in FIG. 2, and the clusters is an example of clusters 246 in FIG. 2.

The process selects a set of past events that are similar to the event, based on the data about the event and the other data about the past events (step 502). The process next analyzes the data about the event and the other data about the past events associated with the set of past events to identify a portion of resources of one or more clusters required for use by the event, wherein the identification comprises using the retrieved preference to calculate the portion of the resources of the one or more clusters required for use by the event (step 504).

Responsive to the identification of the portion of the resources of the one or more clusters required for use by the event, the process allocates, for the event, the portion of the resources of the one or more clusters required for use by the event (step 508) with the process terminating thereafter.

Figure 6:
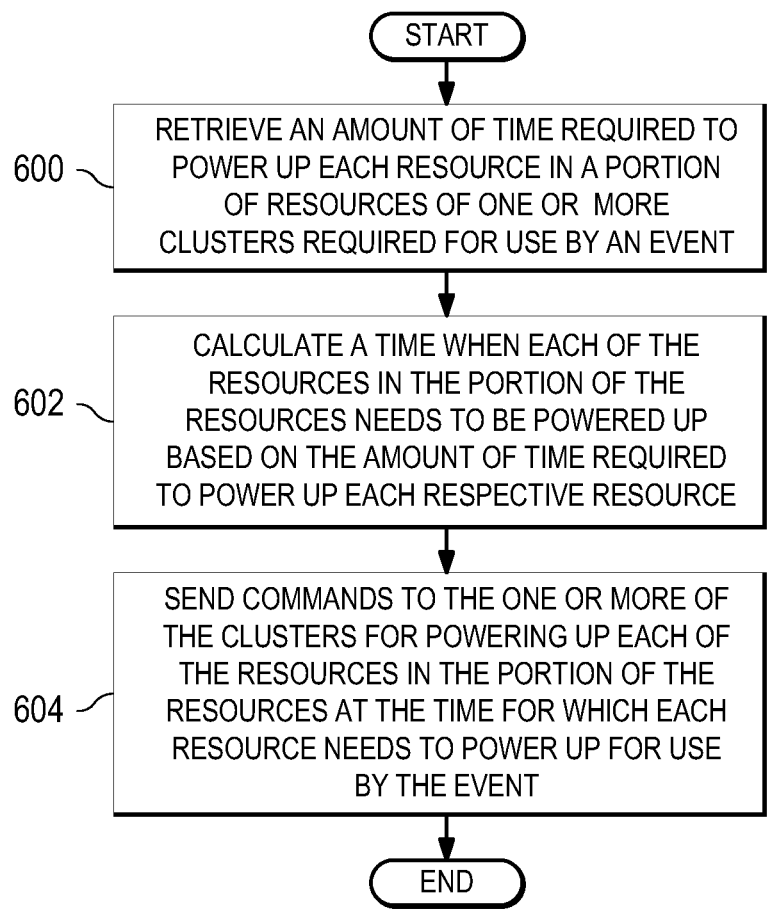
FIG. 6 is a flow chart of a process for powering up resources of clusters for an event in accordance with an illustrative embodiment.

Turning next to FIG. 6, an illustrative example of a flowchart of a process for powering up resources of clusters for an event is depicted in accordance with an illustrative embodiment. The steps in FIG. 6 may be implemented by cluster resource management system 200 in FIG. 2. In particular, the steps in the process may be implemented in software, hardware, or a combination of the two in cluster resource management services 204 in data processing system 202 in FIG. 2.

The process begins by retrieving an amount of time required to power up each resource in a portion of resources of one or more clusters required for use by an event (step 600). The process next calculates a time when each of the resources in the portion of the resources needs to be powered up based on the amount of time required to power up each respective resource (step 602). The process then sends commands to the one or more of the clusters for powering up each of the resources in the portion of the resources at the time for which each resource needs to power up for use by the event (step 604) with the process terminating thereafter.

Turning now to FIG. 7, an illustration of a data processing system is depicted in accordance with an illustrative embodiment. Data processing system 700 is an example of a data processing system that may be used to implement managing resources of clusters in a cluster resource management system. Data processing system 700 is also an example of a data processing system that may be used to implement client device 102 in FIG. 1, cluster resource management system 110 in FIG. 1, and computer system 128 in FIG. 1. More particularly, data processing system 700 may be used to implement data processing system 202 in FIG. 2 and server 218 in FIG. 2. In this illustrative example, data processing system 700 includes communications framework 702, which provides communications between processor unit 704, memory 706, persistent storage 708, communications unit 710, input/output (I/O) unit 712, and display 714. In these examples, communications frame work 702 may be a bus system.

Processor unit 704 serves to execute instructions for software that may be loaded into memory 706. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications framework 702. In these illustrative examples, the instructions are in a functional form on persistent storage 708. These instructions may be loaded into memory 706 for execution by processor unit 704. The processes of the different embodiments may be performed by processor unit 704 using computer implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708. Computer readable storage media 724 also may take the form of a persistent storage, such as a hard drive, a thumb drive, or a flash memory, that is connected to data processing system 700. In some instances, computer readable storage media 724 may not be removable from data processing system 700. In these examples, computer readable storage media 724 is a physical or tangible storage device used to store program code 718 rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations. For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications framework 702 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 706, or a cache, such as found in an interface and memory controller hub that may be present in communications framework 702.

Thus, the illustrative embodiments provide a method, data processing system, and computer program product for managing resources of clusters. In one example, a program runs in a computer system and manages resources of clusters. In this example, the program retrieves data about an event and other data about past events. The program selects a set of past events that are similar to the event, based on the data about the event and the other data about the past events. The program then analyzes the data about the event and the other data about the past events associated with the set of past events to identify a portion of the resources of one or more of the clusters required for use by the event. In another example, the program generates and sends commands to clusters to power down resources that are not needed for use by an event based in part on recent information provided by member of a social network. In still another example, the program generates and sends commands to clusters to power up resources needed for use by the event based on an amount of time required to power up each respective resource.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof.

The flowcharts and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing resources of clusters, the method comprising:
retrieving, by a computer, data about an event and other data about past events;
selecting, by the computer, a set of past events that are similar to the event, based on the data about the event and the other data about the past events;
analyzing, by the computer, the data about the event and the other data about the past events associated with the set of past events to identify a portion of the resources of one or more of the clusters required for use by the event, wherein the portion of the resources is a first portion;
allocating, by the compouter, the portion of the resources of the one or more of the clusters required for use by the event;
receiving, by the compute, updates to the data about the event;
analyzing, by the computer, the updates to the data about the event, the data about the event, and the other data about the past events associated with the set of past events to identify a second portion of the resources of the one or more of the clusters required for use by the event, using a preference for using updates to data about current events, older data about the current events, and the other data about the past events to calculate the portion of the resources of the one or more of the clusters required for use by the event;
determining, by the computer, if a difference exists between the first portion and second portion, and if so, the computer re-allocating the resources of the one or more of the clusters for use by the event based on the difference between the first portion and second portion; and
sending, by the computer, commands to the one or more of the clusters for powering down each of the resources in the first portion that are not in the second portion.

2. The method of claim 1, further comprising:
retrieving, by the computer, an amount of time required to power up each of the resources in the portion of the resources of the one or more of the clusters required for use by the event;
calculating, by the computer, a time when each of the resources in the portion of the resources needs to be powered up based on the amount of time required to power up each respective resource; and
sending, by the computer, commands to the one or more of the clusters for powering up each of the resources in the portion of the resources at the time for which each resource needs to power up for use by the event.

3. The method of claim 1, wherein the data about the event includes a start time for the event, a duration of the event, and an event type, and wherein the other data about the past events includes an amount of resources used by each of the past events, start times for each of the past events, durations of each of the past events, and event types of each of the past events.

4. The method of claim 1, wherein analyzing, by the computer, the data about the event and the other data about the past events associated with the set of past events to identify the portion of the resources of the one or more of the clusters required for use by the event further comprises:
using a preference for using data about current events and the other data about the past events to calculate the portion of the resources of the one or more of the clusters required for use by the event.

5. The method of claim 4, wherein the preference emphasizes using one of data about current events and the other data about the past events.

6. The method of claim 1, wherein the data about the event and the other data about the past events comprise numbers of people attending the event and the past events extracted from, but not limited to, social media, internet traffic, and calendar information.

* * * * *